US006435101B1

(12) United States Patent
Marker et al.

(10) Patent No.: US 6,435,101 B1
(45) Date of Patent: Aug. 20, 2002

(54) FLEXIBLE VANDAL-RESISTANT PANELS

(75) Inventors: William C. Marker, Orinda, CA (US); Klaus H. Kraft, Glenview, IL (US)

(73) Assignee: Burrell Leder Beltech, Inc., Skokie, IL (US)

( * ) Notice: Subject to any disclaimer, the term of this patent is extended or adjusted under 35 U.S.C. 154(b) by 0 days.

(21) Appl. No.: 09/569,779

(22) Filed: May 12, 2000

Related U.S. Application Data

(63) Continuation-in-part of application No. 09/046,667, filed on Mar. 25, 1998, now Pat. No. 6,067,911.

(51) Int. Cl.[7] .................................................. B60D 5/00
(52) U.S. Cl. .......................................... 105/15; 160/264
(58) Field of Search ............................ 160/264; 105/15, 105/18; 442/1; 428/222, 377

(56) References Cited

U.S. PATENT DOCUMENTS

| | | | |
|---|---|---|---|
| 455,427 A | | 7/1891 | Griffin |
| 2,354,045 A | | 7/1944 | Nystrom et al. |
| 2,578,140 A | | 12/1951 | Krupp et al. |
| 3,161,258 A | | 12/1964 | Chapman |
| 3,552,277 A | | 1/1971 | Avital |
| 3,583,465 A | | 6/1971 | Youngs |
| 3,878,879 A | | 4/1975 | Manns |
| 4,234,033 A | | 11/1980 | Leivenzon et al. |
| 4,318,345 A | | 3/1982 | Kleim |
| 4,500,590 A | | 2/1985 | Smith |
| 4,690,194 A | | 9/1987 | Seuster |
| 4,819,565 A | | 4/1989 | Bechu |
| 4,858,535 A | | 8/1989 | Bechu et al. |
| 4,869,178 A | | 9/1989 | Bchu et al. |
| 4,887,660 A | | 12/1989 | Kraus |
| 5,033,395 A | | 7/1991 | Bechu et al. |
| 5,060,577 A | | 10/1991 | Steinmetz |
| 5,353,858 A | | 10/1994 | Hartmann |
| 6,067,911 A | * | 5/2000 | Marker et al. |

FOREIGN PATENT DOCUMENTS

| | | |
|---|---|---|
| DE | 260472 | 10/1905 |
| DE | 42 11 856 A | 10/1993 |
| GB | 660731 | 11/1951 |
| WO | WO 91 12494 A | 8/1991 |

* cited by examiner

*Primary Examiner*—Blair M. Johnson
(74) *Attorney, Agent, or Firm*—Bell, Boyd & Lloyd, LLC

(57) ABSTRACT

A strong, flexible and vandalism-resistant panel is provided. The panel has a flexible interwoven skeleton structure that is embedded in a layer of polymer material. The skeleton structure is formed from a generally parallel arrangement of linear cross-members interconnecting adjacent links. The links are in the form of a triangular wave pattern and include a plurality of link elements interconnected at their opposed ends or peaks by alternately spaced transverse curves or folds. The linear cross-members are nested in the transverse curves of adjacent links to join the adjacent links. The panel of the present invention is particularly useful as a panel used to cover the space between two adjacent railroad car sections. The formed panels are flexible, cannot be dented, are substantially cut-proof, and are highly vandalism-resistant.

11 Claims, 5 Drawing Sheets

FLEXIBLE VANDAL-RESISTANT PANELS

This application is a continuation-in-part of U.S. application Ser. No. 09/046,667, filed on Mar. 25, 1998 Now U.S. Pat. No. 6,067,911.

FIELD OF THE INVENTION

The present invention relates generally to flexible panels of construction used for roll-up doors and flexible links connecting to adjacent railroad car sections together. More specifically, the present invention relates to flexible panels that are resistant to cutting and puncturing.

BACKGROUND OF THE INVENTION

Durable, flexible panels are known. Such panels are incorporated into roll-up doors which are typically fabricated from flexible fabric or pivotally connected horizontal metal slats. The roll-up doors fabricated from flexible fabric are undesirable because they are not sufficiently cut-proof or puncture-proof and therefore are susceptible to vandalism.

While the doors made from connected horizontal slats are sufficiently strong, they are relatively expensive to manufacture because of the difficulty in assembling the interconnected horizontal slots. Further, the roll-up doors made from connected horizontal slats are flexible in a horizontal direction only so they can be rolled up onto a horizontal roll disposed at the top of the door opening. However, these types of roll-up doors are not flexible in a direction that extends outward or inward from the plane of the door. Therefore, these doors are not flexible if an automobile or other structure bumps or engages the door when the door is closed. Often, the metal slots become bent which makes it difficult to extend and retract the door. Further, when one or more of the horizontal slats of the door are sufficiently bent, the entire door or curtain must be replaced.

Another use for a strong material for connecting purposes are vestibule connections for adjoining ends of two railroad car sections. Currently, such vestibule connections are fabricated from accordion-like structures that are a combination of metal frames connected by a webbing that is fabricated from rubber or a combination of rubber and durable fabric. Also, the accordion-like connecting structures can be fabricated entirely from metal.

The currently available vestibule connections suffer from a number of deficiencies. First, if rubber or a fabric material is used to connect the frame components together, the rubber combination of rubber and fabric can be easily cut or damaged by vandals. This is particularly problematic for trains that are transporting valuable commodities, such as luxury automobiles. Typically, in railroad car sections designed exclusively to transport automobiles, the vestibule connection or flexible connection between the railroad cars is the only means of preventing unauthorized entry into the car sections themselves. Accordingly, by fabricating the vestibule connections from rubber or a combination of rubber and fabric, the vestibule connections and therefore the car sections themselves are susceptible to vandalism and unauthorized entry.

Another disadvantage associated with currently available vestibule connections is reliance upon the use of metal frame members in the accordion-like structure. Any damage to these metal frame members often requires replacement of the entire vestibule connection.

Accordingly, there is a need for an improved flexible and very strong material that is resistant to cutting and puncturing. Such an improved material will lead to improved roll-up type doors as well as to improved vestibule connections or covered connections for adjacent railroad car sections. It is also anticipated that such an improved flexible and durable material would have many other applications as well.

SUMMARY OF THE INVENTION

The present invention satisfies the afore-noted needs by providing an improved, flexible and vandal-resistant panel that is fabricated from a flexible metallic skeleton structure such as woven steel wire cloth, woven stainless steel wire cloth, wire belt material or metallic chain link structures, that is embedded in a layer of polymer material such as natural rubber, synthetic rubber, polyvinyl chloride, polyurethane or other polymer materials.

In an embodiment, the flexible metallic structure comprises a chain link structure comprising a plurality of parallel and adjacent links that are interconnected by a plurality of cross-members. Each link is generally in the form of a triangular wave with linear link elements interconnected to one another at transverse arcuate folds. The folds are disposed alternately on opposed first and second sides of each link. Each cross-member is a generally linear strand nested between link elements along a first side of one link and a second side of an adjacent link.

In an embodiment, the polymer is natural rubber.

In an embodiment, the polymer is synthetic rubber.

In an embodiment, the polymer is polyvinyl chloride.

In an embodiment, the polymer is polyurethane.

In an embodiment, the polymer is neoprene.

In an embodiment, the flexible panel of the present invention is incorporated into a roll-up door that comprises a flexible panel made in accordance with the present invention and which has an upper end and a lower end. The upper end is connected to a shaft which, in turn is connected to a pulley mechanism. The pulley mechanism rotates the shaft in a first direction by winding the panel around the shaft and raising the lower end of the panel and the pulley mechanism further rotates the shaft in a second direction for unwinding the panel from the shaft to lower the lower end of the panel.

In an embodiment, a plurality of flexible panels made in accordance with the present invention are used to link two adjacent railroad car sections. Each car section has an end disposed between a first side and a second side as well as a top. The two car sections are spaced apart by a first distance.

In an embodiment, a first side panel is used to link the first sides of the two adjacent car sections. The panel is made in accordance with the present invention as described above. The first panel also has a length that is greater than the first distance thereby providing sufficient slack when the train turns in a direction away from the first sides of the two adjacent car sections. Similarly, a second panel made in accordance with the present invention as described above is used to link the second sides of the adjacent car sections. Again, the second panel has a length that is greater than the first distance which provides sufficient slack when the train turns in a direction away from the second sides of the two adjacent car sections. A top panel, also made in accordance with the present invention, is used to link the tops of the adjacent car sections. Preferably, the top panel also is provided with sufficient slack for turning. As a result, three panels are used to couple or link two adjacent railroad car sections. The panels are strong, durable and cut-proof thereby providing the requisite resistance to vandalism.

In an embodiment, the vestibule connection provided by the present invention includes a top panel and opposing first and second side panels as discussed above. However, the top panel is linked to the first and second opposing side panels by a plurality of shingled sections that are connected together in an end-to-end fashion.

In an embodiment, the top panel and first and second opposing side panels each include an accordion-like or corrugated structure to provide the slack that is necessary when the train turns.

In an embodiment, the shingled sections have an accordion-like structure to provide the necessary slack between two adjoining car sections.

In an embodiment, the present invention provides a method of fabricating a flexible and vandal-resistant panel. The method comprises the steps of providing a plurality of links, each link including a plurality of linear link elements interconnected by transverse arcuate folds disposed alternately on opposite sides of the link. The method also comprises the step of providing a plurality of generally linear cross-members and connecting a first side of each link to a second side of a preceding link by inserting a cross-member between the links so that the cross-member extends between link elements through the arcuate folds disposed along the first side of each link and the second side of the preceding link. Further, the method includes the steps of connecting the second side of each link to a first side of a succeeding link by inserting a cross-member between the links so that the cross-member extends through the arcuate folds disposed along the second side of said each link and the first side of the succeeding link. Finally, the method includes the steps of embedding the connected links or chain link structure in a layer of polymer material.

It is therefore an advantage of the present invention to provide an improved flexible panel which is cut-proof and vandalism-resistant.

Another advantage of the present invention is that it provides an improved flexible panel that cannot be dented.

Yet another advantage of the present invention is that it provides an improved vandalism-proof connecting vestibule for adjacent railroad car sections.

Yet another advantage of the present invention is that it provides an improved curtain for a roll-up door which is vandalism-resistant and which cannot be dented during use.

Still another advantage of the present invention is that it provides an improved method of fabricating flexible, cut-proof and vandalism-resistant panels or curtains.

Other objects and advantages of the invention will become apparent upon reading the following detailed description and appended claims, and upon reference to the accompanying drawings.

BRIEF DESCRIPTION OF THE DRAWINGS

For a more complete understanding of the present invention, reference should now be made to the embodiments illustrated in greater detail in the accompanying drawings and described below by way of examples of the invention.

In the drawings.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

DESCRIPTION OF THE PRESENTLY PREFERRED EMBODIMENTS

Figure 1:
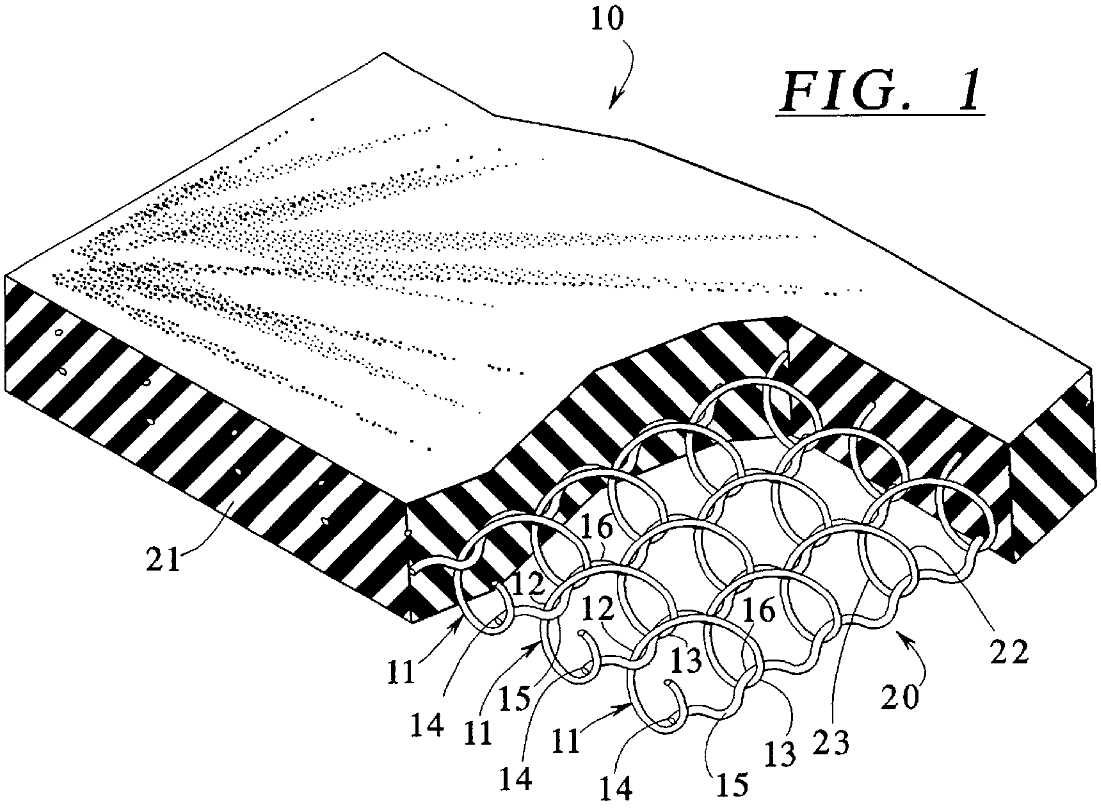
FIG. 1 is a partial perspective view of a panel made in accordance with the present invention.

Turning first to FIG. 1, a partial section of a flexible panel or curtain 10 is illustrated. The panel 10 includes a plurality of parallel and adjacent links 11. Each link is a helical coil having arcuate end portions 12, 13 disposed on opposing first and second sides of each coil 11 respectively. A plurality of parallel and adjacent cross-members 14 are also provided which connect adjacent links 11 together. Specifically, as shown in FIG. 1, a cross-member 14 connects the arcuate end portions 12 of a first side of a link 11 to the arcuate end portions 13 of a second side of an adjacent link 11. Preferably, the cross-members 14 include inward and outward curve portions 15 and 16 for this purpose. That is, the curve portions 15 loop around the arcuate end portions 12 of the first sides of the links 11 and the curved portions 16 loop around the arcuate end portions 13 of the second side of the links 11. In this way, the panel or curtain 10 is provided with a reinforcing skeleton structure 20, such as the chain link structure shown in FIGS. 1 and 2. The skeleton chain link structure 20 is then embedded in a layer of rubber or other suitable polymer material 21. As an alternative, the polymer material 21 may also be fabricated from NEOPRENE™ synthetic rubber.

It will also be noted that the links 11 also include upper and lower connecting portions 22, 23. In a preferred embodiment, the links form a flat helix and therefore the connecting portions 22, 23 are relatively straight and define flat front and rear sides to the panel 10.

Figure 2:
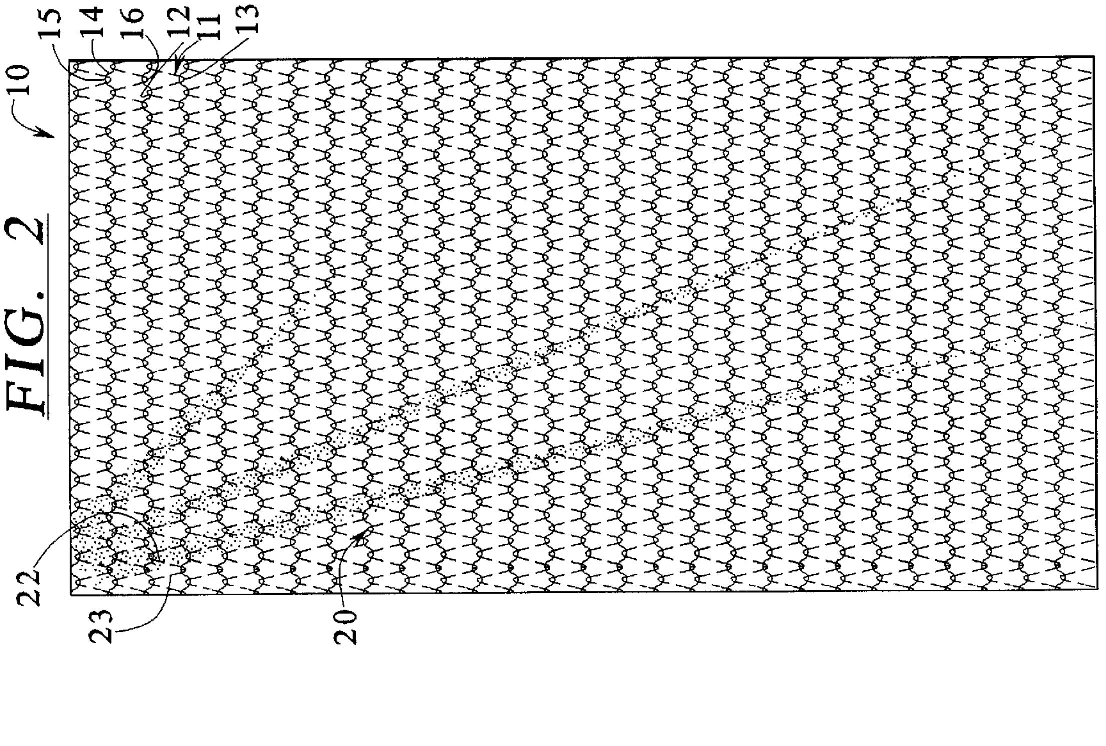
FIG. 2 is a plan view of the chain link structure of the panel shown in FIG. 1.

As illustrated in FIG. 2, the shape of the helix of the links 11 can vary.

However, the upper and lower connecting portions 22, 23 should have a relatively straight configuration to provide flat front and rear surfaces to the panel 10.

Figure 3:
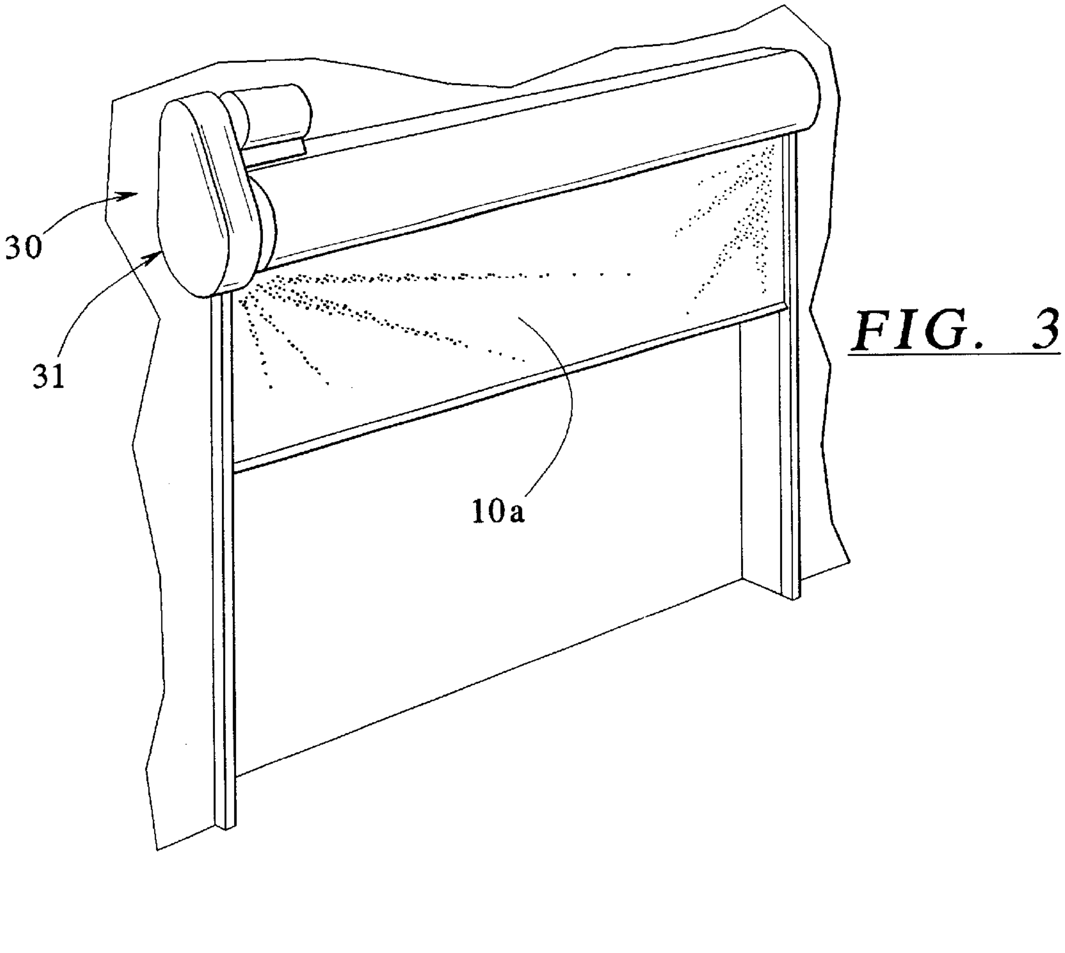
FIG. 3 is a perspective view of a roll-up door made with the flexible panel or curtain of the present invention.

As illustrated in FIG. 3, a panel 10*a* can be incorporated into a roll-up type door system 30. Due to the flexibility of the panel 10*a*, it can be wound upon a shaft (not shown) and raised and lowered by a pulley system like the one shown schematically at 31. The roll-up type door 30 provides a substantial improvement over existing roll-up doors because the panel or curtain 10*a* cannot be dented or bent. It is too flexible. Engagement by an automobile or other vehicle will not dent the panel 10*a* but will merely cause it to flex. The panel 10*a* is also substantially cutproof and therefore is highly vandalism resistant. It is also anticipated that the polymer layer 21 could be provided in a variety of colors, including black, white and other colors to improve the esthetic appearance of the door 30.

Figure 4:
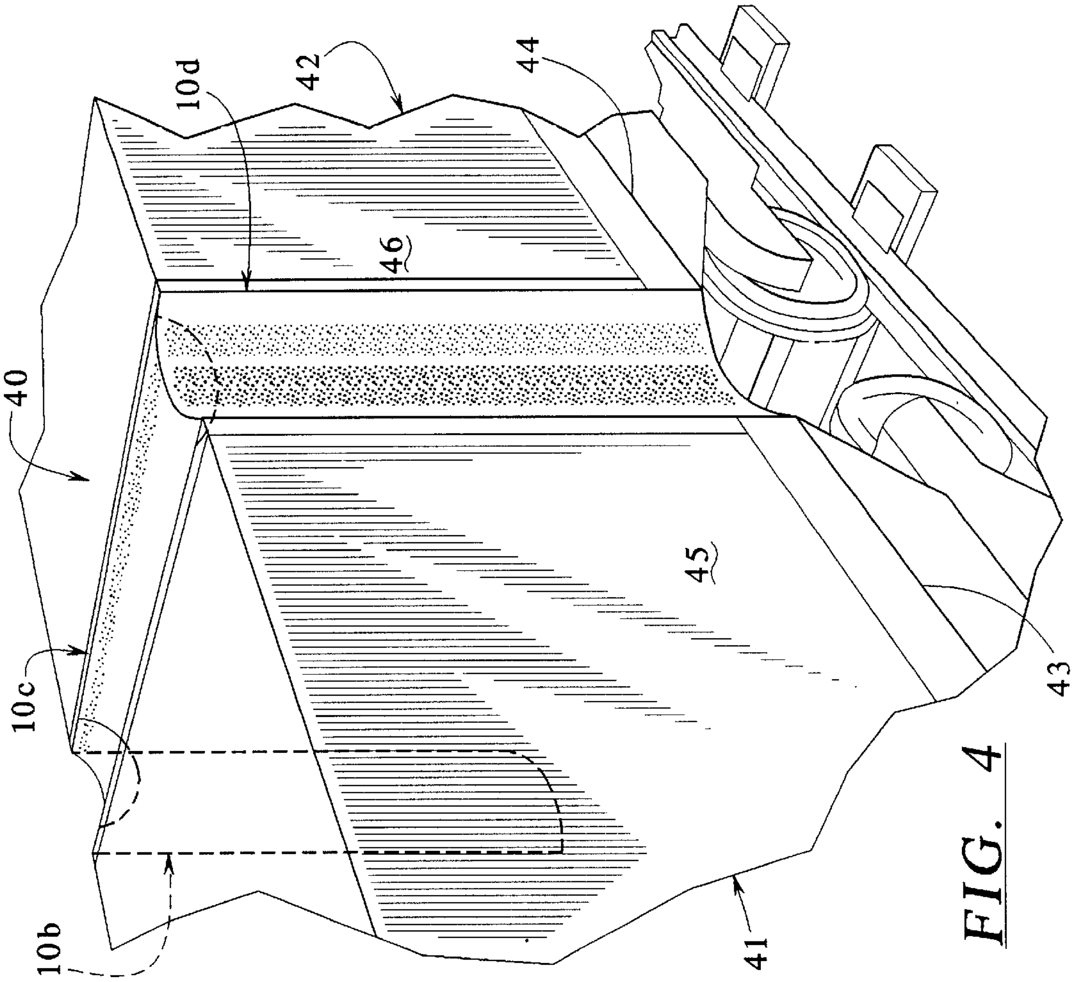
FIG. 4 is a partial perspective view of a vestibule connection for two adjacent railroad car sections made in accordance with the present invention.

As shown in FIG. 4, three panels 10*b*, 10*c* and 10*d* can be used to provide a vestibule-type connection 40 between adjacent railroad car sections 41, 42. Specifically, a panel 10*b* be used to connect adjacent first sides of the two car sections 41, 42. A panel 10*c* can be used to connect adjoining top sides of the adjacent car sections 41, 42. Further, a panel 10*d* can be used to connect adjacent second sides of the car sections 41, 42. It will be noted from FIG. 4 that each of the panels 10*b*, 10*c* and 10*d* have a length that is greater than the spacing distance between the two car sections 41, 42. This additional link provides sufficient slack in the panels which is needed when the railroad car sections make a turn in a direction opposite or away from the side on which the panels are located. Further, the side panels 10*d* (and 10*b*) can be extended downward towards the bottoms 43, 44 of the sides 45, 46 respectively. In this manner, the combination of the side panels 10*b* and 10*d*, along with the top panel 10*c*, provide a secure and near vandalism-proof cover for the space disposed between the two adjoining car sections 41, 42. In the event the cars 41, 42 are carrying expensive cargo, such as automobiles or luxury automobiles, the vandalism preventing characteristics of the present invention become very important.

Figure 5:
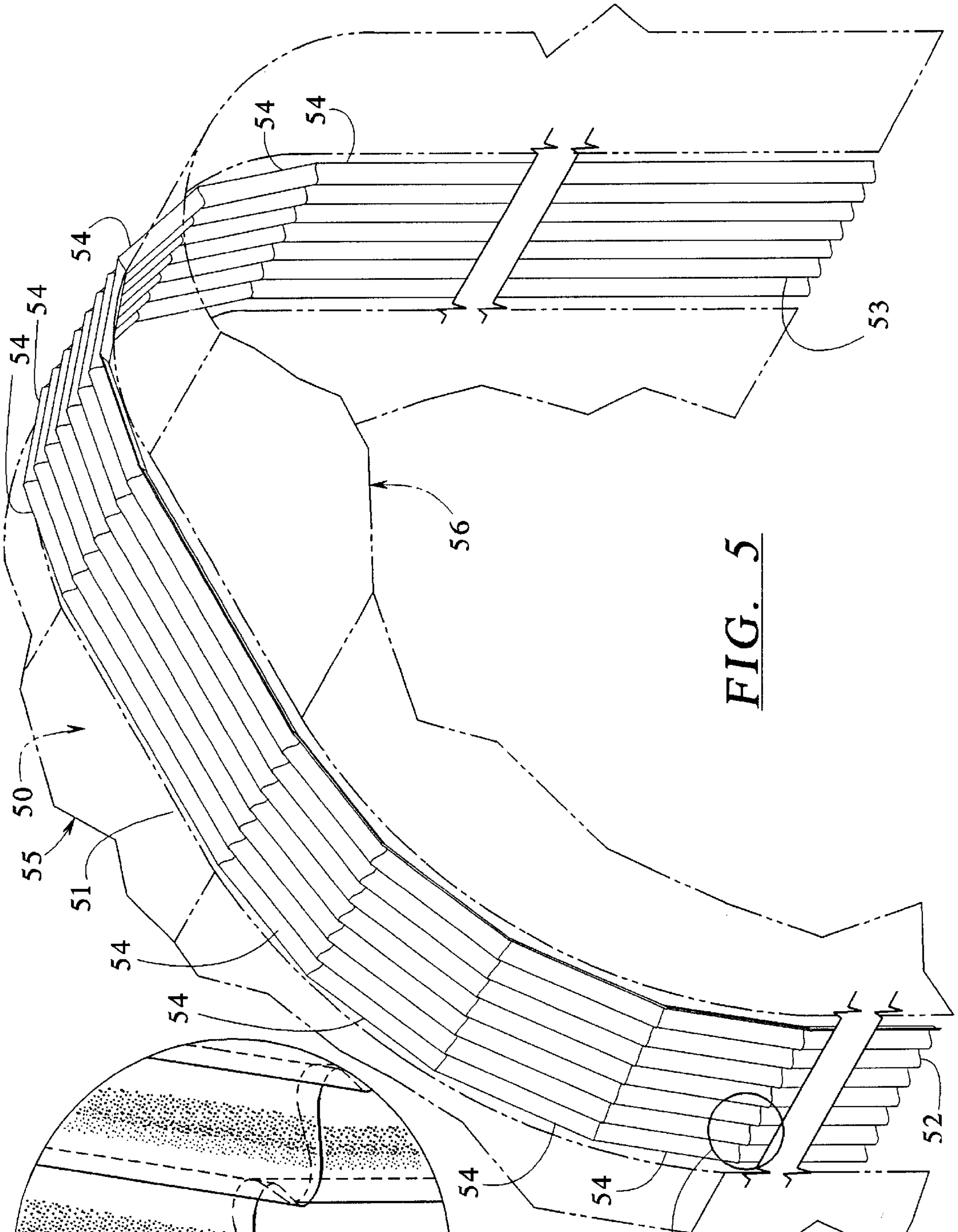
FIG. 5 is a partial perspective view illustrating a vestibule connection made in accordance with an alternative embodiment of the present invention.
Figure 6:
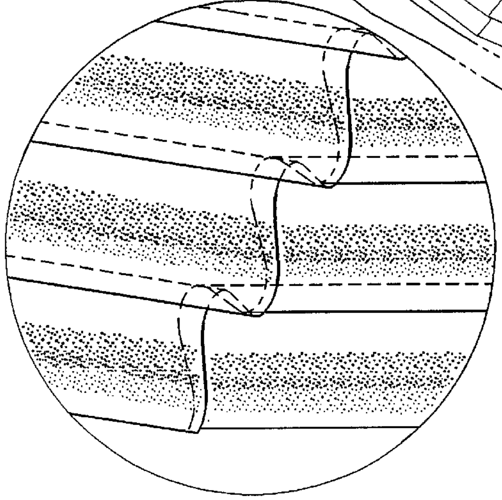
FIG. 6 is an enlarged perspective view of a connection between a shingled panel section and a side panel section as shown in FIG. 5.

In another embodiment as illustrated in FIGS. 5 and 6, a vestibule connection 50 is provided which includes a plurality of panels having a corrugated or accordion-like configuration. Specifically, the connection 50 shown in FIG. 5 includes a top panel 51 disposed between opposing first and second side panels 52, 53. However, in contrast to the configuration shown in FIG. 4, the top panel 51 is connected to the side panels 52, 53 by a plurality of shingled sections shown at 54. The corrugated structure of the panels 51–54 provides the necessary slack required between the two adjacent car sections 55, 56.

Figure 7:
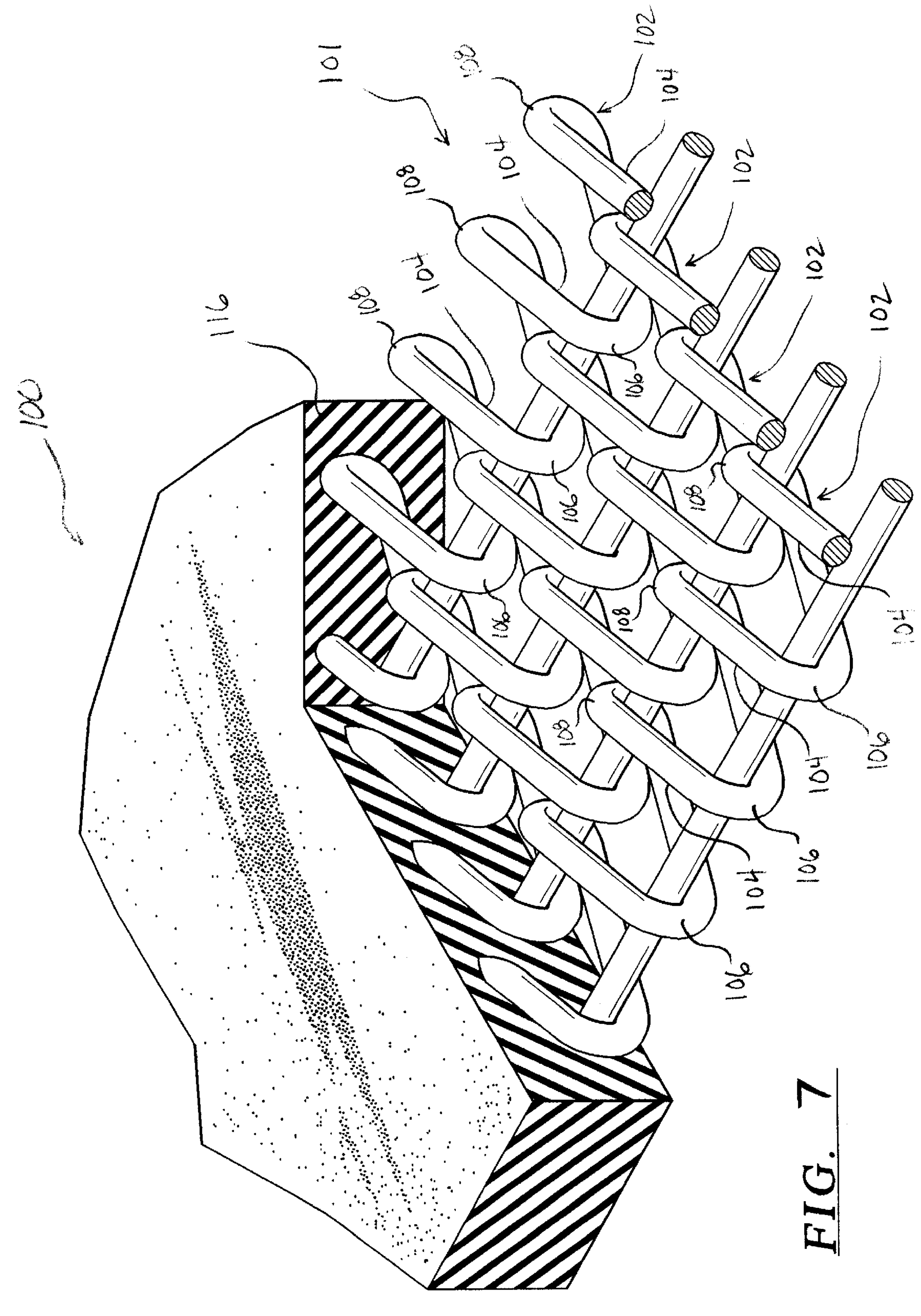
FIG. 7 is a perspective view of part of a panel made in accordance with another embodiment of the present invention.
Figure 8A:
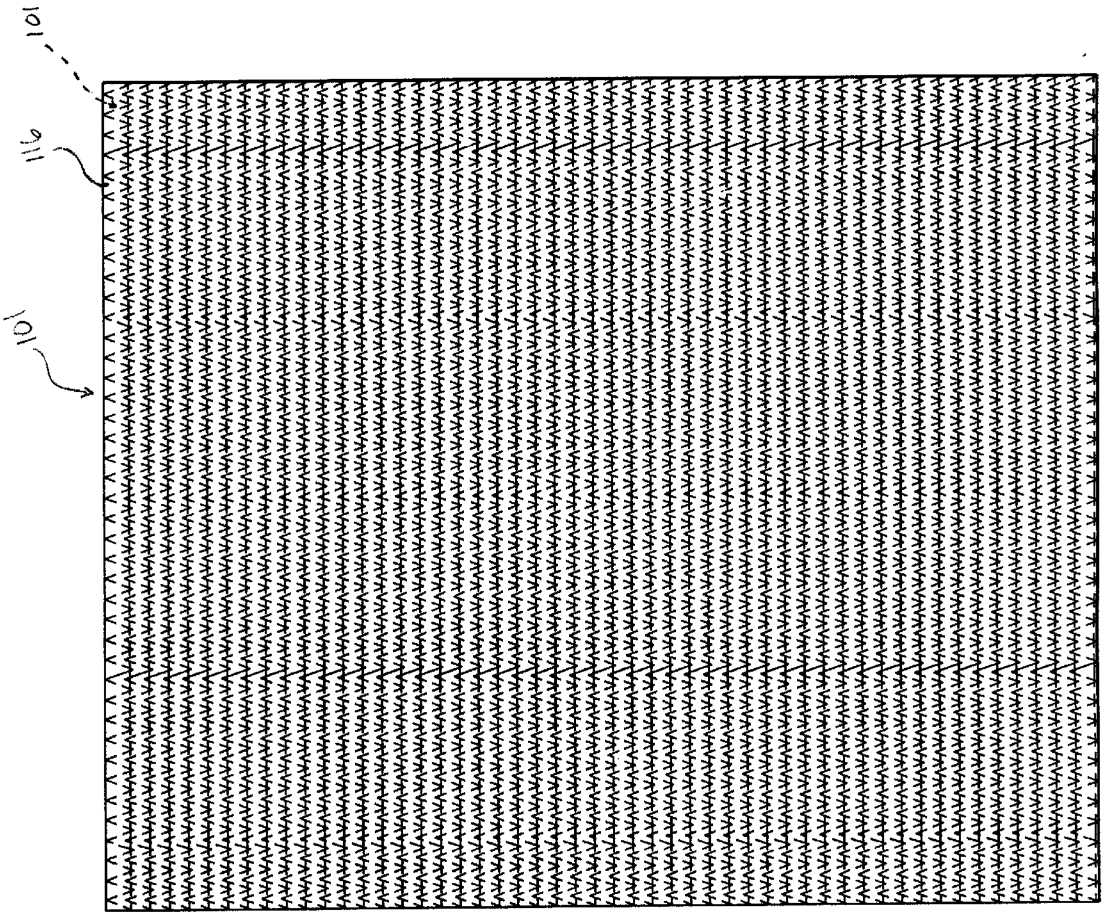
FIG. 8A is a plan view of the panel of FIG. 7 showing the flexible skeleton structure in phantom view.
Figure 8B:
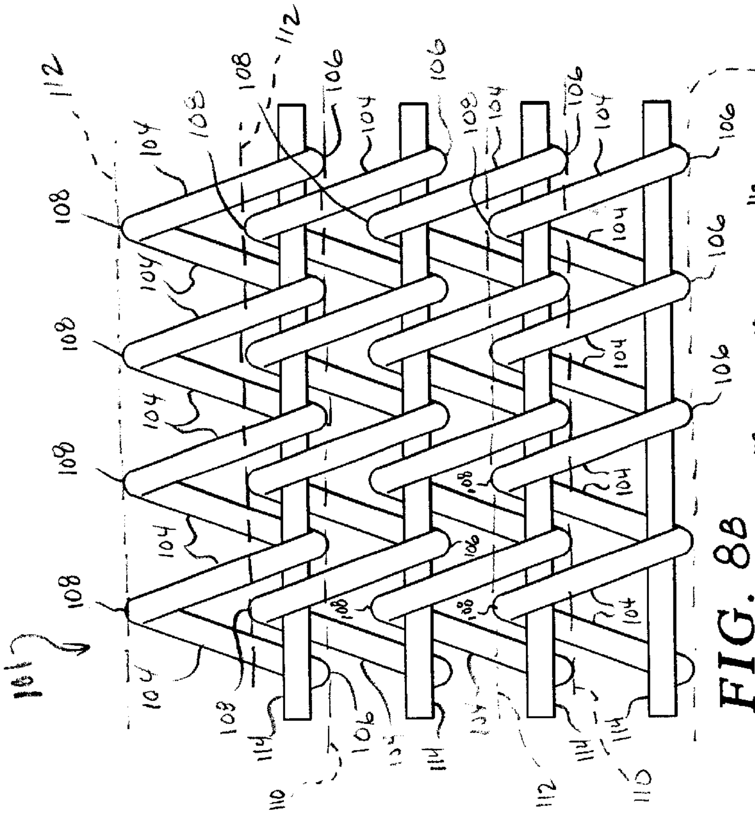
FIG. 8B is an enlarged view of the flexible skeleton structure shown in FIG. 7.
Figure 9:
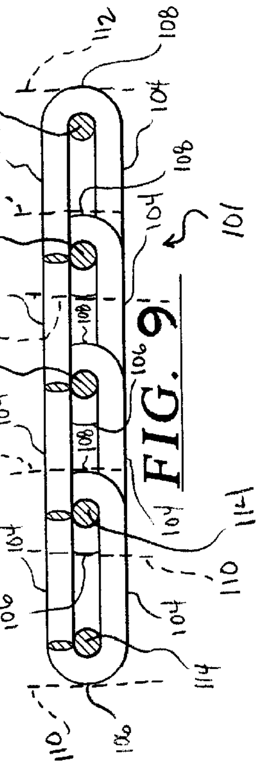
FIG. 9 is an end view of the skeleton structure of FIG. 8B.

FIGS. 7–9 illustrate another embodiment of a skeleton structure according to the present invention. A partial section of an alternative flexible panel or curtain 100 is illustrated in FIG. 7. The panel 100 has a skeleton structure 101 including a plurality of links 102. Each link 102 is generally in the form of a saw-tooth formation or a triangular wave with linear link elements 104 interconnected to one another at opposed ends or peaks 106 and 108 of the link elements 104. In this embodiment, the link elements 104 are essentially linear whereas in the previous embodiment, the link elements were helical coils and curved in nature. Each link 102 has a first side or edge 110 and an opposite second side or edge 112 extending along the links and defined by the peaks 106 and 108, respectively. The peaks 106 and 108 are transverse arcuate folds defining a curved nest therein. The peaks 106 and 108 are spaced alternately along the first and second side of each link 102.

A plurality of generally parallel and adjacent cross-members 110 are also provided that interconnect adjacent links 102 to one another. In this embodiment, each of the cross-members 114 is a generally straight or linear wire element. As best illustrated in FIGS. 7 and 8B, each cross-member 114 is received or nested between the link elements 104 adjacent the opposite ends or peaks 106 or 108 within the arcuate folds. Each cross-member 114 therefore interconnects the second side 112 of one link to the first side 110 of an adjacent link.

In this embodiment, the thickness of the mesh or skeleton structure 101 including each of the links 102 and cross-members 114 can be formed fairly thin. This is best illustrated in FIG. 9. The thin cross-section permits a more flexible and thinner panel 100 or shade construction and can be embedded in a thinner polymer material 116. The wire mesh skeleton structure 101 in this embodiment is therefore flexible and yet cut-proof and vandalism-resistant.

The angle of the joint at the peaks or ends 106 and 108 between adjacent link elements 104 can be varied and the length of the link elements 104 can also be varied. The density of the mesh can be varied by altering the angle and the link element length in this embodiment. A tightly woven skeleton structure 101 can be provided that is highly cut-proof, vandalism-resistant and yet very flexible and fairly thin in nature. The panels 100 can also have a planar overall form or an alternative corrugated form. The skeleton structure 101 described above could be altered to accommodate the corrugations.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

What is claimed is:

1. A flexible connection system for extending between two adjacent railroad car sections, the adjacent car sections being spaced apart by a first distance, each railroad car section having an end disposed between a first side and a second side, each car section further having a top, the connection system comprising:

a first side panel extending between the first sides of the adjacent car sections, the first side panel having a length that is greater than the first distance;

a second side panel extending between the second side of the adjacent car sections, the second side panel having a length that is greater than the first distance;

at least one top panel extending between the top of the adjacent car sections, the at least one top panel having a length that is greater than the first distance;

each of the first side, second side and top panels being fabricated from a puncture resistant polymer material comprising a flexible interwoven skeleton structure embedded in said polymer material wherein the skeleton structure includes a plurality of adjacent links interconnected by a plurality of parallel and spaced apart cross-members;

each link in the form of a continuous triangular wave defining a plurality of generally linear link elements interconnected to one another at transverse arcuate folds spaced alternately along opposing first and second sides the link; and each cross-member in the form of a generally linear strand that extends between adjacent link elements nested in the transverse arcuate folds along the first side of one link and the second side of an adjacent link to connect the adjacent links.

2. The connection system of claim 1 wherein the flexible skeleton structure is a metallic chain link material.

3. The connection system of claim 1, wherein the skeleton structure and the polymer material layer of each panel further have an overall corrugated configuration.

4. The connection system of claim 1 wherein the plurality of links and cross-members are formed from the same material.

5. The connection system of claim 1, wherein the polymer is selected from a group consisting of natural rubber, synthetic rubber, polyvinyl chloride and polyurethane.

6. A method of providing a flexible and vandal resistant connection system for adjacent first and second railroad car sections, the first and second car sections being spaced apart by a first distance, each railroad car section having an end disposed between a first side and a second side, each car section further having a top, the method comprising:

connecting the first side of the first car section to the first side of the second car section with a first side panel, the first side panel having a length that is greater than the first distance;

connecting the second side of the first car section to the second side of the section car section with a second side panel, the second side panel having a length that is greater than the first distance;

connecting the top of the first car section to the top of the section car section with a top panel, the top panel having a length that is greater than the first distance; and providing each of the first side, second side, and top panels from a puncture resistant polymer material including a skeleton structure having a plurality of adjacent links interconnected by a plurality of parallel and spaced apart cross-members with the skeleton structure embedded in said polymer material, wherein each link is in the form of a continuous triangular wave defining a plurality of generally linear link elements interconnected to one another at transverse arcuate folds spaced alternately along opposing first and second sides the link, and each cross-member is in the form of a generally linear strand that extends between adjacent link elements nested in the transverse arcuate folds along the first side of one link and the second side of an adjacent link to connect the adjacent links.

7. A flexible panel for extending between two adjacent railroad car sections, the flexible panel comprising:

a plurality of adjacent links each in the form of a continuous triangular wave defining a plurality of generally linear link elements interconnected to one another at transverse arcuate folds that are spaced alternately along opposite first and second sides of each link;

a plurality of elongate and generally linear cross-members each extending between adjacent link elements and being nested in the transverse arcuate folds along the first side of one of the links and the second side of the adjacent link to connect the adjacent links, the plurality of cross-members and links together defining a flexible interwoven skeleton structure; and a layer of a polymer material in which the interwoven skeleton structure is embedded wherein said material is puncture resistant.

8. The flexible panel of claim 7, wherein the flexible skeleton structure is a metallic chain link material.

9. The flexible panel of claim 7, wherein the flexible skeleton structure and the polymer material layer further have an overall corrugated configuration.

10. The flexible panel of claim 7, wherein each link and cross-member is formed from the same material.

11. The flexible panel of claim 7, wherein the polymer material is selected from a group consisting of natural rubber, synthetic rubber, polyvinyl chloride and polyurethane.

* * * * *